United States Patent [19]

Candy et al.

[11] Patent Number: 4,491,982

[45] Date of Patent: Jan. 1, 1985

[54] TERRESTRIAL LIGHT BEAM COMMUNICATION SYSTEM

[75] Inventors: James C. Candy, Middletown; Bernard G. King, Rumson, both of N.J.

[73] Assignee: AT&T Bell Laboratories, Murray Hill, N.J.

[21] Appl. No.: 399,140

[22] Filed: Jul. 16, 1982

[51] Int. Cl.³ .............................................. H04B 9/00
[52] U.S. Cl. ..................................... 455/607; 455/601
[58] Field of Search ............... 455/601, 605, 606, 607, 455/617; 356/141, 152

[56] References Cited

U.S. PATENT DOCUMENTS

| | | | |
|---|---|---|---|
| 2,982,859 | 5/1961 | Steinbrecher | 455/617 |
| 3,504,182 | 3/1970 | Pizzurro et al. | 455/607 |
| 3,566,126 | 2/1971 | Lang et al. | 455/607 |
| 4,291,977 | 9/1981 | Erdmann et al. | 356/152 |

Primary Examiner—Joseph A. Orsino, Jr.
Attorney, Agent, or Firm—John F. Moran

[57] ABSTRACT

A terrestrial light beam communication system is described for compatible utilization with existing radio transmission systems. The transmitter (FIG. 4) utilizes aiming means (41 and 42) to control the aim of the transmitted light beam. The receiver employs an array of detectors (FIG. 5) from which a circuit (FIG. 6) determines the position of the received light beam. The position of the received light beam is used to control the position of the transmitted light beam from which control signals are developed to maintain the aim of the transmitted light beam to combat the occurrence of ongoing fluctuations in the vertical deflection experienced by the transmitted light beam.

12 Claims, 6 Drawing Figures

PROFILE OF TYPICAL TRANSMISSION PATH

TERRESTRIAL LIGHT BEAM COMMUNICATION SYSTEM

This invention relates to communication systems and, more particularly, to terrestrial communication systems which utilize a transmission medium subject to the variations of atmospheric conditions.

Radio systems provide one form of terrestrial communication systems. Such systems often operate at microwave frequencies employing highly directional antennas on towers separated by spans to complete numerous voice and data circuits linking one location to another, such as between distant cities. The burgeoning demands of the present (digital) information age are being borne by communication systems. In order to accommodate such demands, digital techniques are frequently being employed in terrestrial radio systems to increase their informational carrying capacity. Unfortunately, multipath propagation or clear air fading disrupts the operation of the systems. Diversity antenna, protection switching of spare channels, equalizers and various other sophisticated techniques have been employed with varying degrees of success to combat the problem of clear air fading. Numerous technical articles addressing this problem clearly illustrate its extent and severity.

When such a problem is severe, it would be highly desirable to be able to resort to some form of alternative communication link to avoid the problem and its attendant effects. Since such systems have a rather high informational capacity, an existing alternative may not be readily available without overloading its capability.

One of the primary purposes of this invention is to provide an alternative adaptable to existing radio systems to the extent of being piggyback thereon and yet is immune to the clear air fading phenomenon. When multipath fading disrupted radio transmission at frequencies of 6 and 11 GHz in an experimental radio span, optical communication over the same span exhibited immunity to fading and was demonstrated to be a reliable alternative with high informational carrying capacity.

Although highly focused light beam communication is not susceptible to multipath fading, the aim of the light beam is susceptible to ongoing fluctuations in the vertical direction probably due to the changing nature of the temperature and pressure gradients in the atmosphere along the transmission path. Horizontal deflections are small relative to the vertical deflections since the atmosphere is relatively homogenous in the horizontal direction. Accordingly, it would be necessary for a reliable light beam communication system to provide automatic compensation for maintaining aim of the light beam at the receiver location.

SUMMARY OF THE INVENTION

Broadly, the invention takes the form of an arrangement for automatically controlling the aim of a well focused light beam directed at a receiver to maintain reliable communication over spans corresponding to those used in terrestrial radio communication systems.

The invention in one of its aspects utilizes the position of a received light beam to control the aim of a transmitted light beam to compensate for ongoing fluctuations in vertical deflections encountered by the transmitted light beam. An attendant advantage of such a technique is that the channel capacity of the optical light beam is fully realized since the form of the control information does not occupy channel capacity.

More specifically, the invention compensates for ongoing vertical fluctuations in the deflection of the transmitted light beam while capitalizing on the presence of relatively small horizontal fluctuations. Accordingly, the lateral position of a received light beam indicates the vertical position of a transmitted light beam at its receiver. The inventive technique controls vertical deflection by using lateral positioning each on light beams transmitted in opposite directions to complete an adaptive control loop employing a form of negative feedback. Accordingly, effective automatic aiming control is established between two points between which reliable two-way light beam transmission is maintained.

A further aspect of the invention provides a technique and arrangement for reestablishment of the two-way transmission after total disruption of transmission. This aspect capitalizes on the recognition that vertical deflections of light beams transmitted in opposite directions transverse the same medium and track each other.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
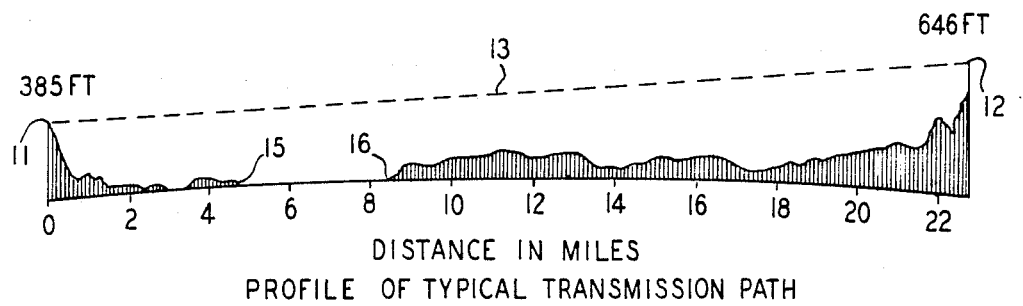
FIG. 1 represents a transmission span over which the invention may suitably provide high capacity communications with reliability.

FIG. 1 illustrates the profile of a typical transmission path over which the inventive principles may be used to provide communication. Transmitting and receiving towers are located at points 11 and 12 which are separated a distance of approximately 23 miles. The vertical scale used in FIG. 1 exaggerates the elevation of the profile. The actual transmission path 13 provides line of sight two-way communication between points 11 and 12. The distance between points 15 and 16 represents about three miles of tidal water. Although the transmission path 13 of FIG. 1 is shown individually typically a number of such spans may be arranged in tandem to traverse any distance, for example, providing communication between distant cities.

Figure 2:
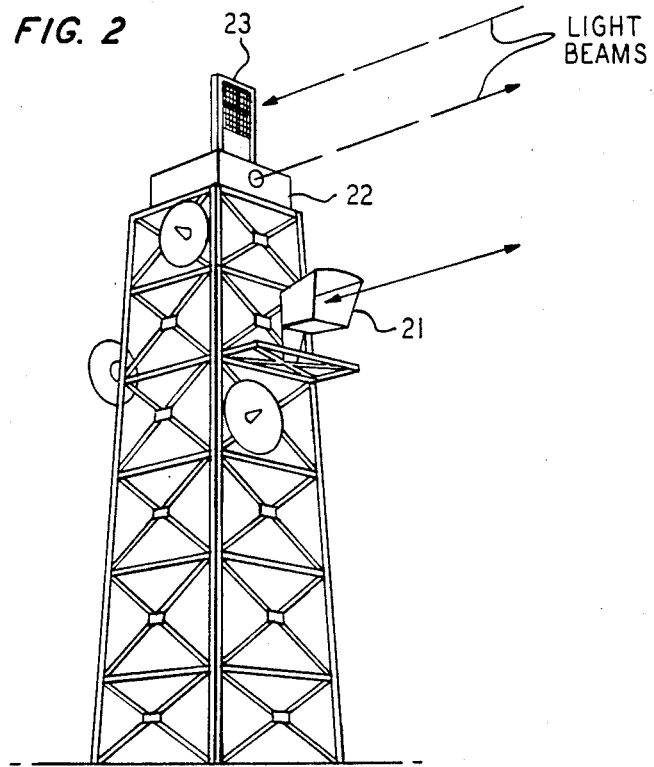
FIG. 2 is a radio transmission tower on which the inventive arrangement is deployed.

At each of points 11 and 12, a tower such as shown in FIG. 2 or any other suitable structure may be utilized to provide the desired elevation to provide an obstruction free transmission path. It should be pointed out that in FIG. 2 radio antenna 21 provides radio communication between it and a distantly located antenna as indicated in the foregoing. Radio transmission is subject to the phenomena of clear air fading which disrupts the communication between any one of the spans in a microwave communication system. Accordingly, transmitting structure 22 provides an alternate medium of transmission over a light beam while a receiving array 23 receives an incoming light beam which, in turn, includes receiving and transmitting components similar to transmitter 22 and receiver target 23. Of course if the tower of FIG. 2 serves as a relay for passing communication to neighboring towers on either side of it, a duplicate set of equipment is required for full duplex communication in the opposite direction.

Figure 3:
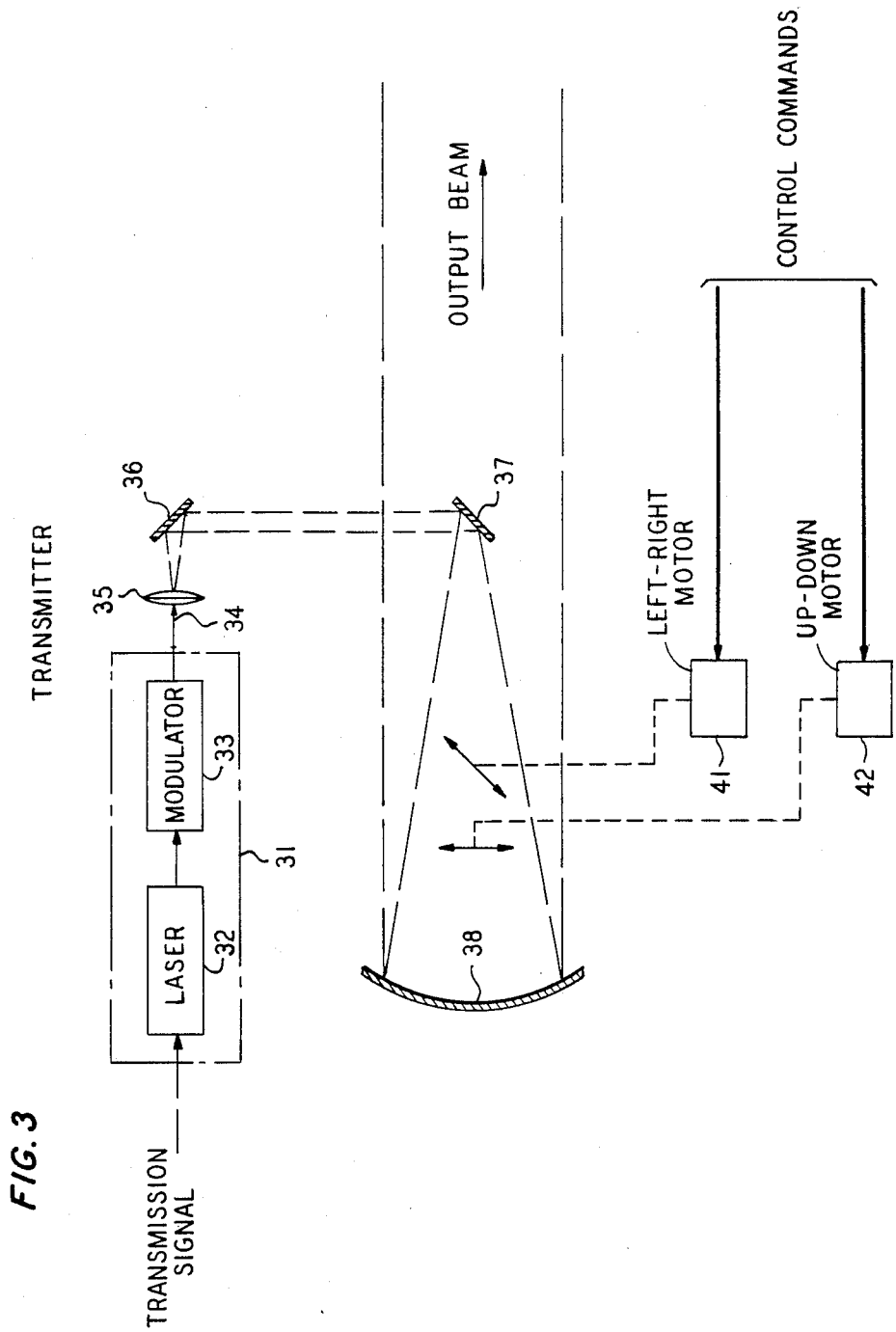
FIG. 3 is a block diagram of an illustrative transmitter employing inventive principles.

FIG. 3 is a block diagram of a transmitter suitable for the application shown in FIG. 2. In FIG. 3, the signal path starts with modulated source 31 which includes laser 32 and modulator 33 to produce modulated coherent light beam 34. Coherent light beam 34 is expanded by convex lens 35 to illuminate mirror 36 which deflects the light beam to illuminate mirror 37. Both mirrors 36 and 37 are planar mirrors. Mirror 37 serves as an optical feed for concave circular mirror 38 which produces an output beam approximately one foot in diameter at the transmitter. The expanded beam avoids possible obstruction of the beams by small particles in the transmission path. The direction of launch of the output beam is controlled by motors 41 and 42. Motor 41 controls the left/right (horizontal) movement or deflection of the output light beam while motor 42 controls the up/down (vertical) movement. Each of motors 41 and 42 are responsive to respective control commands.

Figure 4:
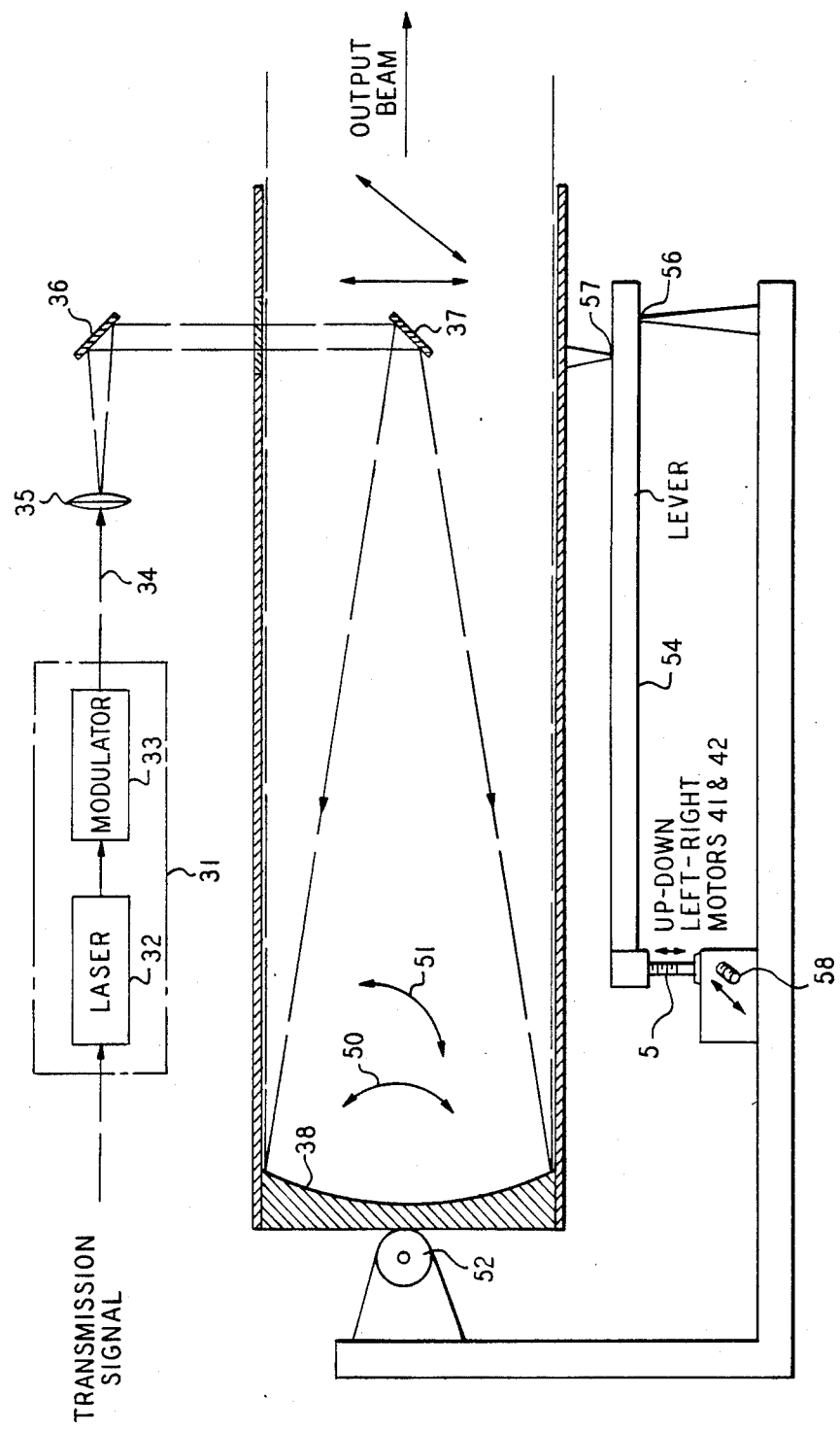
FIG. 4 illustrates the mechanical arrangement for controlling the direction of the transmitted light beam.

FIG. 4 depicts an illustrative mechanical embodiment for controlling the vertical and horizontal launch or projection of the output light beam from a transmitter. Components common to both FIGS. 3 and 4 are designated with the same reference numerals. The arrangement of FIG. 4 functions to pivot concave circular mirror 38 in a highly controlled manner in a series of predefined increments or steps through an arc indicated by dual directional arrows 50 and 51 about gimbal 52. Up/down motor 42 may be a small DC motor which turns worm 53 to raise and lower lever 54 which is pivoted about fulcrum 56. As lever 54 changes in elevation it changes the elevation of fulcrum 57 which produces an arcuate displacement of mirror 38 about gimbal 52 in accordance with arrow 50. In an experimental transmitter constructed in accordance with FIG. 4 the occurrence of a control signal for one second moved the optical beam 13.5 inches at the receiving site 23 miles away or through an arc of 9.3 microradians per second. Additionally, worm 58 (shown on end) is turned by motor 41 of FIG. 3 to change the horizontal direction of the projected beam through arc 51 also about gimbal 52. These changes in horizontal direction are also performed in a series of controlled increments or steps.

Laser 32 is a relatively low-powered device having an optical output of less than 20 milliwatts (mW) within the visible spectrum. With a transmitted beam of one foot in diameter at the transmitter, the optical beam is disbursed at the receiver site to produce a beam 20 feet in diameter with the optical power at the diameter termination being 10 dB down from the center of the beam. With a power differential of 20 dB the diameter of the beam corresponded to approximately 30 feet.

Figure 5:
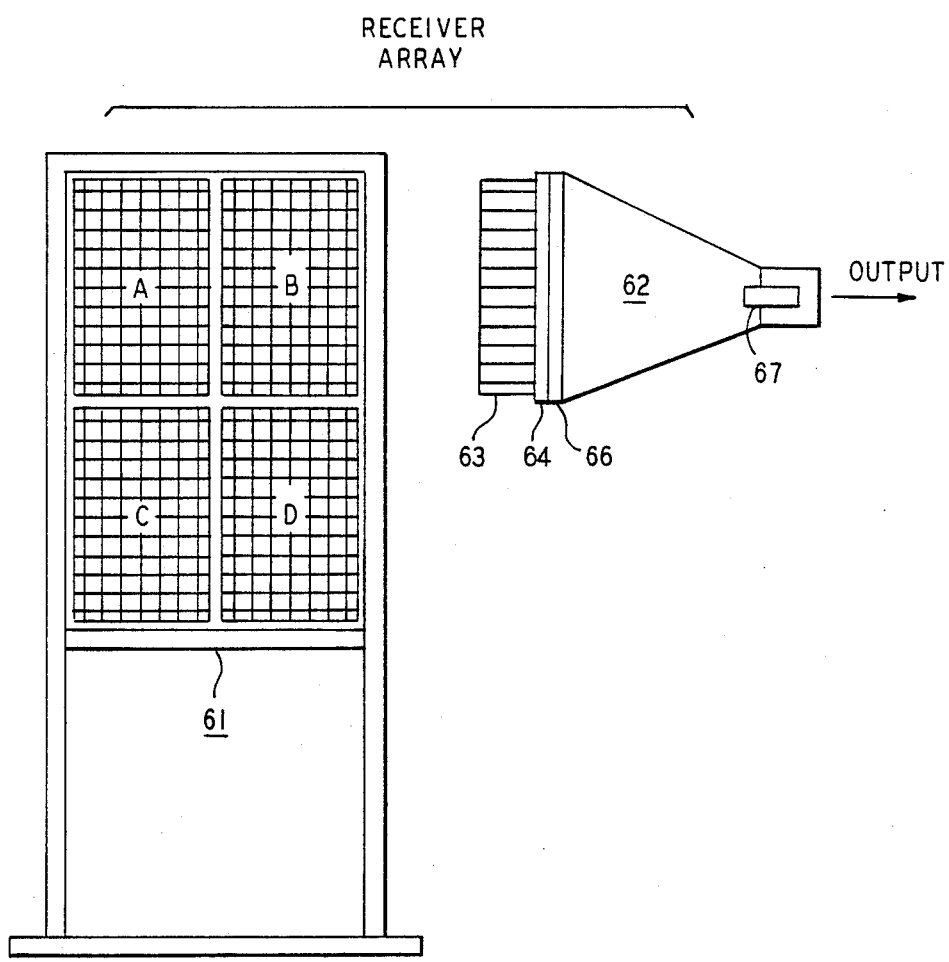
FIG. 5 illustrates an array for receiving the transmitted light beam.

FIG. 5 illustrates receiver array 61 and one of the four identical detectors A-D used therein. Each of detectors A-D has a receptive surface of about one foot square. The four detectors have the same construction as that illustrated for detector 62. The receptive surface of detector 62 initially includes filter 63 which serves to attenuate scattering light from reaching Fresnel lens 64 and filter 66 transparent to the frequency of laser 32. This arrangement desirably reduces background optical noise energy from reaching photomultiplier 67 located at the focal point of Fresnel lens 64.

Figure 6:
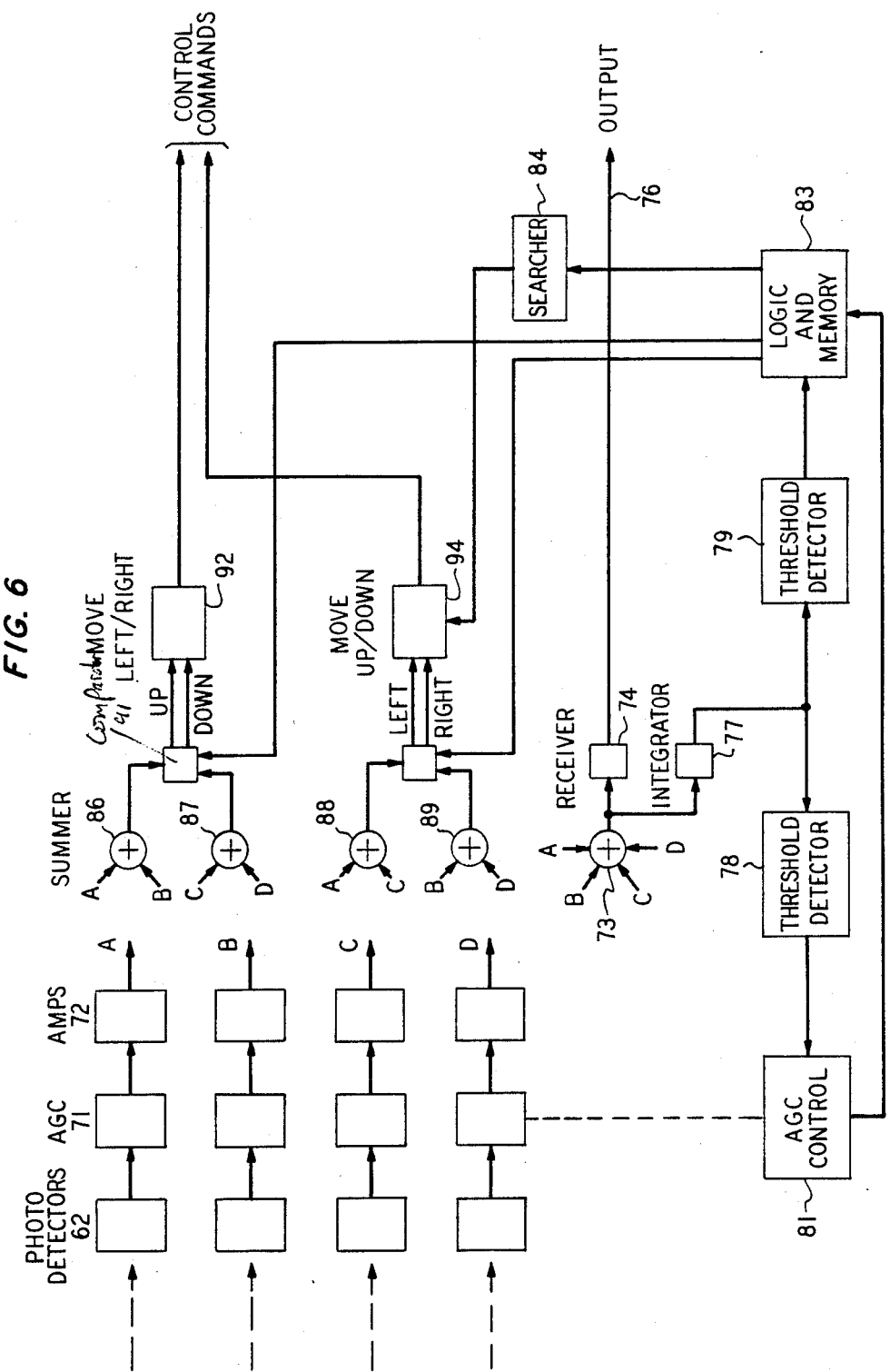
FIG. 6 is a block diagram of the receiver circuit which develops control commands in addition to the communication signal output.

FIG. 6 is a receiver control circuit responsive to the outputs of photodetectors A-D to provide control over the aim of the transmitter (control commands) in addition to a received output. Each of multipliers 62 outputs is first gain stabilized by automatic gain circuits (AGC) 71. The output of each of AGC's is then amplified and homodyned detected in amplifier 72 to produce the outputs designated as A, B, C and D in FIG. 6. For the receiver output, combiner 73 sums the signals A-D to drive receiver 74 which produces transmission output 76. The sum output of combiner 73 is also supplied to integrator 77. The output of integrator 77 is fed to both threshold detectors 78 and 79. Detector 78 provides an input for AGC control 81 which controls AGC's 71 in unison. This latter arrangement provides immunity from scintillations or momentary fluctuations in the strength of the received optical signal. Threshold detector 79 indicates the occurrence of a system dropout to logic and memory 83. In the event of a dropout of significance, searcher 84 cooperates with logic and memory 83 and operates to reestablish system operation.

Summers 86–89 are utilized to determine the position of the light beam on the target array of FIG. 5. For up/down position determination, summer 86 combines the outputs of the two upper detectors (A & B) while summer 87 combines the output of the two lower detectors (C & D). Then comparator 91 compares the outputs of summer 86 to summer 87 and issues either an up-/down signal or no signal to indicate the position of the light beam on the target array. The location of the target array will be called the local site. The output of comparator 91 is converted by move left/right 92 to a pulsed voltage level (control command) for incrementally operating a DC motor such as motor 41 to move the light beam transmitted back to the target array located at the original transmitter site which will be called the remote site. The relative lateral position of the light beam on the target array located at the remote site is used to control the up/down light beam positioning at the local site. This arrangement conveniently eliminates the need for a separate control signal to be sent back from the receiver site to the transmitter since the lateral position of the beam at each receiver location is used to control the vertical aim of the transmitter.

Similarly, the relative strength of the outputs of summers 88 and 89 at the local site is used by comparator 93. Then, move up/down converter 94 drives the motor, similar to motor 42, to move the position of the light beam up or down at the remote site. Since horizontal deflections are relatively small, a change in horizontal light beam position at a receiver may be used by its transmitter to compensate for the ongoing vertical fluctuations due to diurnal temperature changes in the atmosphere.

Directional control of the light beam position may be now summarized. When the received beam at a station moves downward, the beam transmitted from that station is directed to the left. When the received beam moves up, the beam transmitted from that station is directed to the right. When the received beam moves left, the transmitted beam is directed up. When the received beam moves right, the transmitted beam is directed down. The arrangement for controlling the light beam aim in accordance with this summary provides negative feedback that tends to correct the spurious diurnal deflections which would ordinarily disrupt light beam communication over spans compatible with existing radio systems. The reversal of the relationships of left with up and right with down may be readily changed as long as the controlling positional axis is orthogonal to the response axis.

In order that large vertical deflections can be corrected by signaling with small horizontal deflections there is an advantage to designing the motor drives so that detection of a horizontal displacement causes the vertical motor to run continuously at a speed proportional to the deflection. Detection of a vertical displacement will then cause the horizontal motor to move by a proportionate angle. Such an arrangement will provide stabilized aim in the transmission of light beams through the atmosphere.

When atmospheric conditions are unfavorable, for example, in heavy rain or fog, the power of the received light beam can become so low that it is not capable of being detected by the receiver and control is lost. To regain control, the following method is proposed. The method relies on the observed fact that horizontal drift in the light beam is slow and small, and that drift in the vertical deflections of the two beams track one another since they traverse the same medium.

When the received energy at either station falls below a set threshold predetermined in the design of threshold detector 79, the position control switches off and the local transmitter is locked to its horizontal direction and moved to a reference point at one (down) extreme in the vertical directions. This action kills the beam received at the other end and its transmitter is then set to the reference position. Clocks internal to logic and memory 83 and searcher 84 which are located at each station then start to produce regular timing signals in synchronism at periods of approximately 3 seconds. At these times, the beams step up by a fixed amount that is equivalent to a fraction of the receiving aperture.

Because vertical deflections introduced in the atmosphere in opposite directions track, both receivers should locate their beams at the same time interval. When they do, control is re-established. If the receivers do not find their beams after a set number of steps the procedure is repeated. The clock intervals are made large compared with the response time of the positioning mechanisms and with expected errors in the clocks. The step size in the vertical aim of the light beam is made small enough to accommodate possible error or backlash in the mechanisms used to aim the light beam.

It should be understood that the foregoing describes illustrative embodiments of the invention. For example, possible modifications of the electrical, optical, mechanical, and electromechanical arrangements may readily occur to those skilled in the art while practicing the invention. Although such modifications are numerous and varied, some typical changes may alter the optical arrangement for producing the highly focused optical beam or change the electrical or mechanical aspects of the servo control system. Other possible alterations may include utilization of a different type of receiver array which may employ other types of optical detectors than the photomultipliers disclosed herein.

What is claimed is:

1. A terrestrial optical transmission system comprising:
    transmitting means at a local location for projecting a first light beam to a predetermined location, said transmitting means including aiming means for changing the direction of transmission of the first light beam,
    receiving means, at said predetermined location, for receiving optical energy in spatially displaced stationary locations, said receiving means comparing the optical energy received at each displaced location to the other displaced locations to determine the position of the first light beam amongst the spatially displaced locations, and said receiving means producing a correction signal, and
    second transmitting means at said predetermined location including second aiming means for changing the direction of transmission of a second light beam projected in a direction opposite to the first light beam, the second aiming means response to the correction signal of said receiving means and indicating the vertical position of the first light beam by changing the horizontal aim of the second light beam.

2. The transmission system of claim 1 further comprising second receiving means at the local location for receiving optical energy in spatially displaced locations from said second light beam, said second receiving means determining the horizontal position of said second light beam and reproducing, the correction signal for the aiming means to maintain vertical alignment of the first light beam aimed on its receiving means.

3. A terrestrial optical transmission system comprising::
    transmitting means at a local location for projecting a first light beam to a predetermined location subject to changing vertical deflections, said transmitting means including first aiming means of changing the direction of transmission of the first light beam,
    receiving means, at said predetermined location, for receiving optical energy in spatially displaced stationary locations, said receiving means comparing the optical energy received at each displaced location to the other displaced locations to determine the position of the first light beam amongst the spatially displaced locations, and said receiving means producing a correction signal,
    second transmitting means at said predetermined location including second aiming means for changing the direction of transmission of a second light beam projected in a direction opposite to the first light beam, the second aiming means responsive to the correction signal of said receiving means and changing the aim of the second beam laterally to indicate the vertical position of the first light beam, and
    second receiving means, at the local location, for receiving optical energy in spatially displaced locations from said second light beam, said second receiving means determining the horizontal position of said second light beam and reproducing the correction signal for the first aiming means to keep the first light beam aimed on its receiving means by compensating for the changing vertical deflections.

4. The transmission system of claim 3 wherein when said first light beam moves laterally said second aiming means moves the second light beam vertically.

5. The transmission system of claim 4 wherein said second aiming means shifts the second light beam to the left when the first light beam moves down, shifts the second light beam to the right when the first light beam moves up, shifts the second beam up when the first beam moves left, and shifts the second beam down when the first beam moves right.

6. Apparatus for use in a terrestrial light beam communication system having separate transmission paths for the light beam being transmitted and the light beam being received, the apparatus comprising:
   transmitting means capable of producing a modulated light beam for transmission;
   aiming means for automatically controlling the direction of transmission of the light beam in response to a control output; and
   controlling means for determining the position of a received light beam in a target area separate but in the proximity of said transmitting means, the horizontal position of the received light beam being continuously responsive to the vertical aim of the light beam being transmitted; and the controlling means producing the control output for the aiming means to keep the transmitted light beam properly aimed.

7. Apparatus for use in a terrestrial light beam communication system, the apparatus comprising:
   receiving means, including a stationary array of detectors located directly in the path of a received light beam, for producing an output indicative of the position of the received light beam, and
   signaling means responsive to the output for sending an indication of the position back to the site where the light beam originated for maintaining proper aim of the light beam, the signaling means including a light source for generating a light beam and aiming means for controlling the direction of launch of the light, the aiming means moving the direction of launch along an axis orthogonal to the movement of the position of the received light beam.

8. Apparatus for use in a terrestrial communication system, the apparatus comprising:
   transmitting means capable of producing a first modulated light beam for transmission having a first transmission path;
   aiming means for controlling the direction of launch of the first modulated light beam along a first axis in response to a control output; and
   controlling means for producing the control output, the controlling means including a stationary target for determining the location of a second modulated light beam along a second axis orthogonal to the first axis being transmitted to the stationary target over a second transmission path different from the first transmission path, and the controlling means serving to change the aim of the first modulated light beam to correct its aim along the first axis.

9. A transmitter for a light beam communication system comprising:
   aiming means for controlling the elevation angle of launch of a light beam, and
   controlling means located directly in the path of a received light beam comprising a stationary receiver array, the controlling means responsive to horizontal deflections indicative of the vertical aim of the launched light beam, said aiming means and controlling means cooperating for maintaining the vertical aim of the launched light beam for reliable communication when the launched light beam is subjected to fluctuations in diurnal vertical deflection.

10. A relay station for a two-way light beam communication system comprising:
    transmitting means for transmitting a modulated highly focused light beam to a remote site, and
    receiving means responsive to a received light beam originating for transmission from the remote site,
    the transmitting means including aiming means for controlling the direction of projection of the light beam being transmitted by the transmitting means, and
    the receiving means including controlling means continuously responsive to the horizontal position of the received light beam which is indicative of the vertical aim of the transmitted light beam, the controlling means cooperating with the aiming means for keeping the transmitted light beam on target.

11. In a communication link between a local point and a remote point, apparatus controlling the aim of a beam of radiant energy comprising:
    means for sending a highly focused beam of radiant energy from the local point to the remote point along a first transmission path;
    means for receiving the radiant energy and determining possible corrections for improving the aim of the beam;
    means for signaling the correction by changing the aim of a returning highly focused beam of radiant energy generated at the remote point; the returning beam of radiant energy having a second transmission path separate from the first transmission path and
    aiming means including receiving means for continuously detecting a shift in the aim of the returning beam along one axis and correcting the aim of the sending beam along another axis orthogonal to the one axis.

12. In a light beam communication system, first transmitting means, at a local site, for launching a first modulated light beam in a first transmission path to a remote site subject to variable deflections along a first axis, the first transmitting means including first aiming means for changing the aim along the first axis and in a second axis orthogonal thereto;
    first receiving means, at the local site, including a target and having two outputs, the first output producing signals indicative of the signal information on a received modulated light beam, the second output producing a first correction signal indicative of deflections of the first modulated light beam at the remote sit and a second correction signal indicative of the variable deflections at the local site;
    second transmitting means, at the remote site, for launching a second modulated light beam in a second transmission path different from said first transmission path to the target of the first receiving means said second beam serving as the received modulated light beam at the local site, the second transmitting means including second aiming means for changing the aim of the second modulated light beam along the first axis and along the second axis orthogonal thereto;
    second receiving means, at the remote site, including a target and having two outputs, the first output producing signals indicative of the signal information on the first modulated light beam, the second output producing a third correction signal indicative of the deflections of the second modulated light beam and a fourth correction signal indicative of the variable deflections of the first modulated light beam; and the directional control loop for maintaining the aim of each transmitting means at one site by compensating for deflections along said first axis including the receiving means at the other site for producing a correction signal indicative of the deflection, the aiming means of the transmitting means at the other site responsive to the receiving means at that site for producing a change in aim along said second axis indicative of the deflection, and the receiving means at the one site reproducing the correction signal in response to aim changes along said second axis first produced at the other site, and the aiming means at the one site responsive to the correction signal being reproduced for maintaining the aim of the transmitted light beam during the deflections.

* * * * *